April 6, 1965 R. G. ERNST 3,177,066
REDUCTION OF GERMANIUM DIOXIDE
Filed Dec. 17, 1962 3 Sheets-Sheet 1
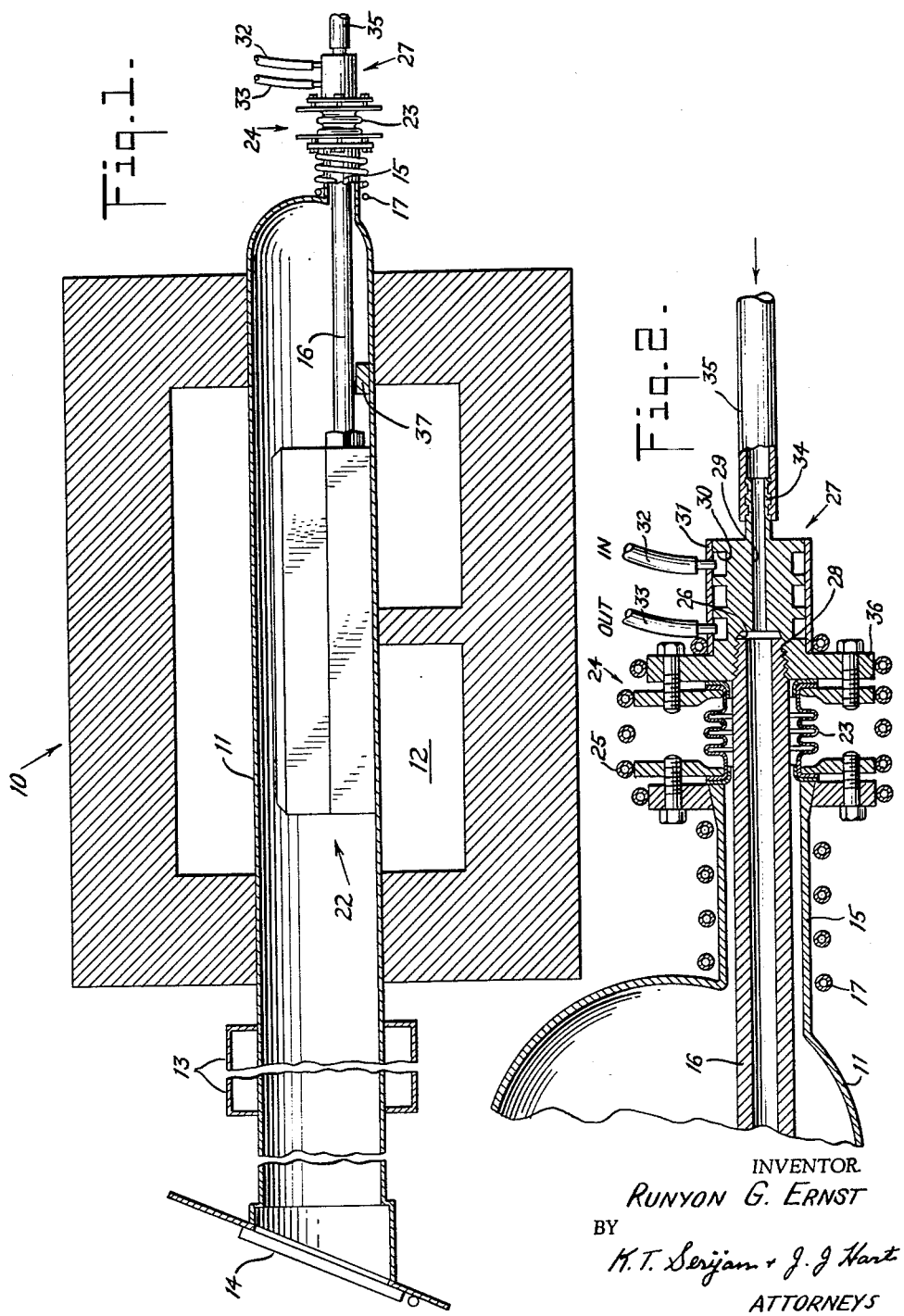
INVENTOR.
RUNYON G. ERNST
BY
K. T. Serijan + J. J. Hart
ATTORNEYS

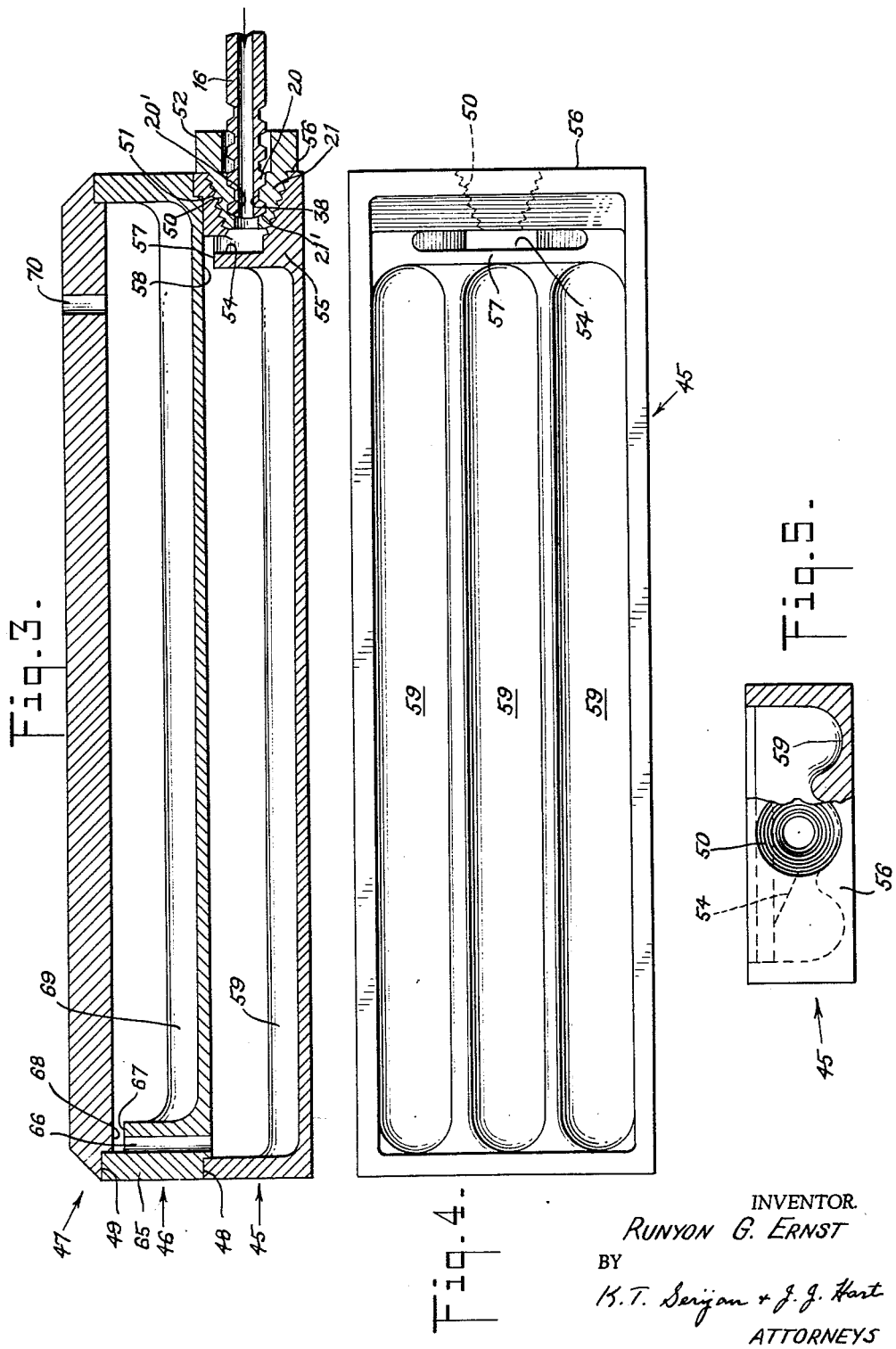

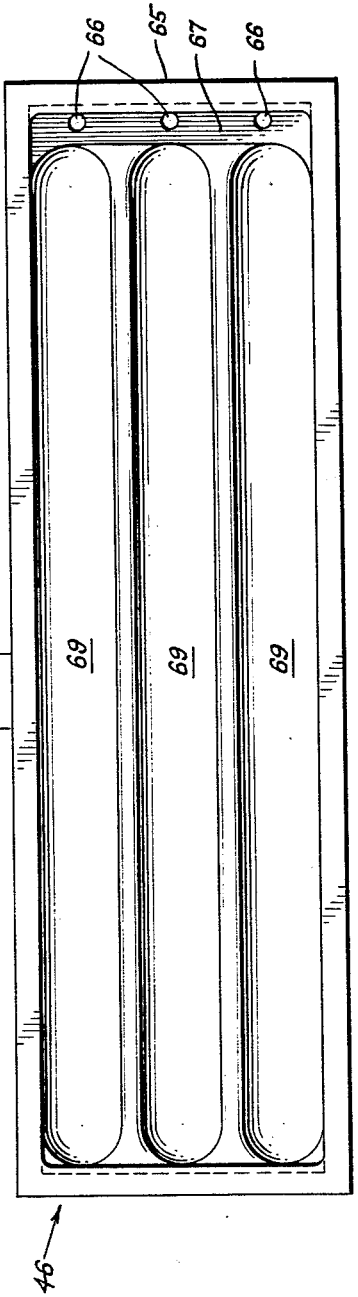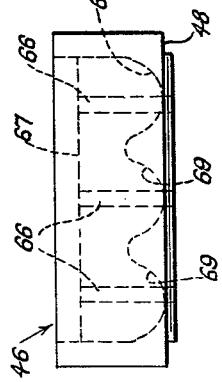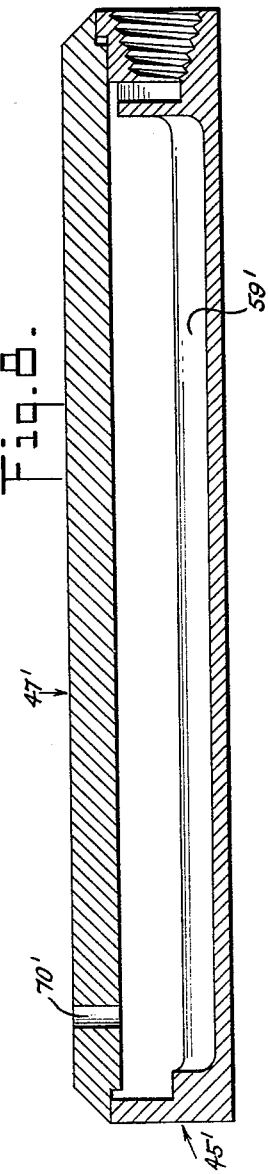

United States Patent Office 3,177,066
Patented Apr. 6, 1965

3,177,066
REDUCTION OF GERMANIUM DIOXIDE
Runyon G. Ernst, Woodbridge, N.J., assignor to American Metal Climax, Inc., New York, N.Y., a corporation of New York
Filed Dec. 17, 1962, Ser. No. 245,066
13 Claims. (Cl. 75—84)

This invention relates to the production of germanium metal, and is concerned more particularly with the practice of reducing germanium dioxide in producing the metal.

In the extraction of germanium, the source material is usually first converted to the oxide by standard distillation and purification of the tetrachloride, followed by hydrolysis, and the oxide is then reduced in a suitable atmosphere to the metal. The reduction of the oxide is usually effected by subjecting a small batch of the oxide in a pure graphite crucible to a temperature of 650° C. in an atmosphere of hydrogen, cracked ammonia, or other reducing gas. When reduction is complete, the temperature is gradually raised to 1000° C. or thereabouts for a short period in order to bring about the fusion of the metal. The crucible and the ingot formed therein are withdrawn from the furnace after cooling in a reducing or neutral atmosphere. In the usual procedure, the resulting reduced metal from a 5000 gram charge, for example, has an average weight of about 3500 grams and has taken at least twenty-two hours to produce.

I have found that the water vapor formed from the batch of germanium dioxide during the reducing operation has an important bearing on the reduction time and in the usual procedure prevents the intermixture of the reducing gas with the oxide to such an extent as to cause a marked decrease in the reduction efficiency.

It is the object of the present invention, therefore, to provide an improved method of subjecting the germanium dioxide to the reducing gas to accomplish a substantial enhancement in the gas efficiency and consequently a marked improvement in the germanium dioxide reduction time. In accordance with the invention, these advantageous results thereof are brought about by the provision of an improved furnace boat for the germanium dioxide, and an improved method of supplying the reducing gas to the batch of oxide material in the boat. As a result of these improvements, the processing time heretofore requiring the usual twenty-two hours for the treatment of a 5000 gram charge has been lowered to approximately eight hours.

For a better understanding of the invention, and the advantages and novel features thereof, reference is made to the following description which should be read in conjunction with the accompanying drawings, in which FIG. 1 is a vertical sectional view of a reduction furnace containing germanium dioxide boats embodying the invention;

FIG. 2 is an enlarged vertical sectional view of the right hand end of the furnace shown in FIG. 1;

FIG. 3 is a vertical sectional view of the stacked boats shown in the furnace of FIG. 1;

FIG. 4 is a top plan view of the bottom boat in the stack;

FIG. 5 is an end elevational view of the right hand end of the bottom boat, as viewed in FIG. 3;

FIG. 6 is a top plan view of the top boat in the stack;

FIG. 7 is an end elevational view of the left hand end of the top boat, as viewed in FIGS. 3 and 6; and FIG. 8 is a vertical sectional view of a single boat provided with a cover in accordance with the invention.

In the drawings, the numeral 10 indicates generally a suitable electriaclly heated reduction furnace, such as the type of furnace known as the Lindberg Muffle Furnace. As disclosed, such a furnace includes a silica muffle 11 arranged so that its closed rear end portion extends horizontally through the furnace chamber 12, the muffle extending forwardly from the furnace, and through and beyond a cooling chamber 13. The forward, open end of the muffle 11 is provided with a door 14 which is slidably operated to open and close the muffle chamber. At its closed end, the muffle 11 is provided with a tubular extension 15 of reduced cross-section through which extends a carbon feed tube 16 and around which is wrapped cooling water piping 17.

In accordance with the invention, the forward end of the tube 16 is provided with a pipe thread 20 adapted to be threadedly received in an adapter 21 connected to the bottom one of the two stacked boats 22 located in the portion of the muffle 11 extending through the furnace chamber 12 during the reducing operation. The rear end portion of the tube 16 projects beyond the rear end of the extension 15 and through a Teflon bellows 23 forming part of an expansion joint 24 constituted otherwise of silica or metal pieces, and sealed at its ends by asbestos inserts utilizing bolts, clamps or other suitable fastening means. The expansion joint is enclosed by suitable water cooling piping 25. The rear end of tube 16 is tapered and seats in a conical seat 26 provided at the inner end of a threaded recess formed in one end of a cooling device 27. The tube 16 is provided adjacent to its tapered end with a pipe thread 28 adapted to be threadedly received in the threaded recess of the device 27. The device 27 is in the nature of a water cooled adapter and includes a central gas passageway 29 in alignment with the passageway of tube 16 and encircling recesses 30 which are enclosed by a jacket 31 and together with the latter form a water cooling system for keeping the rear end portion of tube 16 comparatively cool. Cooling water is fed from a suitable source into the system through a tubing 32 and is discharged therefrom through a tubing 33; the tubings being connected to the jacket 31 by suitable connectors, as indicated. The device 27 is further provided at its rear end with a suitable tubing connector 34 forming an extension of the passageway 29 thereof and formed to provide a secure anchorage for the tubing 35 through which the reducing gas is fed to the furnace from a suitable source in a known manner.

It will be understood from the foregoing, that in preparing the furnace for an operation, the stacked boats 22 with the adapter 21 connected thereto, are inserted through the door 14 into the muffle 11 until the boats are located in the furnace chamber 12 with the adapter 21 in position to be engaged by the forward end of the tube 16. While holding the stack of boats in position in the muffle, the tube 16 is inserted through the rear of the muffle, over a movable graphite, grooved guide 37 therefor and into engagement with the adapter 21; the thread 20 at the forward end of the tube 16 being threadedly interengaged with the locking thread 38 provided in the adapter 21. When the tube 16 is properly secured to the adapter, the forward convexly-shaped end 20′ thereof, will be seated in fluid tight relation against the concavely-shaped seat 21′ provided in the adapter 21. The device 27 is then assembled in fluid tight relation on the rear end of the tube 16 and the flange 36 thereof connected to the members of and forming part of the expansion joint 24. With the parts properly assembled and the various connections completed to the sources of gas and water supply, the furnace is put into operation. The reducing gas supplied to the tube 16 is fed directly by the latter to the bottom boat in the stack 22. As will hereinafter more clearly appear, the gas passes over the dioxide charge in the bottom boat and leaves at the forward end of the latter. From the bottom boat the gas passes in a reverse direction over the dioxide charge in the top boat and then exits from the rear end of the latter into the muffle, from which it discharges through the door 14 thereof. This procedure brings the gas into greater intimacy with the dioxide than has heretofore been possible and because of this and the higher velocity of the gas as it passes through the boats, which become in effect part of the gas conducting means, the water vapor is removed from the boats as it is formed thereby increasing the efficiency of the reducing operation to the extent that the complete cycle of operation of the furnace has been reduced to approximately eight hours. The reduction operation itself is carried out at a temperature of approximately 650° C. until it is completed, whereupon the temperature is gradually raised to approximately 1,000° C. to bring about a fusion of the resulting metal in the boats. The boats are then disconnected from the tube 16 by loosening the threaded connection therebetween and moved into the portion of the muffle 11 extending through the cooling chamber 13. After the metal has sufficiently cooled in an atmosphere of either a reducing gas or a neutral gas such as nitrogen, which is fed through the disconnected tube 16, the boats containing the resulting germanium ingots are withdrawn through the door 14 of the furnace.

It will be observed more clearly from a consideration of FIGS. 3 to 7 of the drawings, that in the embodiment of the invention illustrated therein, the stack of boats 22 in which the dioxide charge is reduced, is composed of a bottom graphite boat 45, a top graphite boat 46, and a graphite cover 47 for the top graphite boat. The bottom boat 45 is a rectangularly-shaped tray approximately seven inches wide, one foot eleven inches long, and two and one-half inches high. The top boat 46 is also in the form of a rectangular tray with similar overall dimensions and is provided around the periphery of its bottom wall with a continuous groove 48 to receive the top edges of the walls of the bottom boat forming the top rim of such boat. The cover 47 is also rectangular and provided in its bottom surface with a peripheral groove 49 to receive the top edges or rim of the top boat 46. It will thus be seen that the boats and cover may be readily assembled in exact stacked relation and will maintain such relation while being moved into and out of the furnace. The outer edge of the cover may be beveled to minimize damage thereto during handling of the same.

The rear wall 55 of the bottom boat is relatively thick (approximately two inches) and is provided with a tapered, threaded gas inlet 50 which extends inwardly approximately one and one-half inches and to which is threadedly connected the frusto-conically shaped threaded inner end 51 of the adapter 21. The outer end 52 of the adapter 21 is cylindrically-shaped and of a diameter greater than the diameter of the outer enlarged end of inlet 50 so that when the adapter 21 is fully engaged in such inlet, the outer end 52 thereof will engage the adjacent outer surface 56 of the end or rear wall 55. The inlet opening 50 is in communication at its inner end with the lower end of a transverse vertically disposed slot-like opening 54 which extends across more than half the width of the boat and upwardly to the top of the rear wall 55. The front portion of wall 55 containing such opening 54 is reduced in height to provide a horizontal shoulder or shelf 57 which together with the bottom surface of the top boat 46 define a passageway 58 bringing the top discharge end of opening 54 into communication with one end of the interior of bottom boat 45. It will be noted more clearly from FIG. 4, that the interior of bottom boat 45 is divided into a plurality of ingot molds by three longitudinally extending grooves 59, 59 and 59 formed in the bottom wall of such boat. The grooves 59 are substantially semi-circular in cross-section and have a maximum depth approximately one-third the height of the interior of bottom boat 45. The width of opening 54 is such that its sides extend approximately to the longitudinal centers of the two outer grooves 59. Opening 54 therefore discharges gas through passageway 58 into the entry ends of all three grooves 59.

The three grooves 59 extend the entire length of the interior of boat 45 and the other or discharge ends thereof underlie the thickened front end wall 65 of the top boat 46 which projects inwardly from the front wall of the bottom boat 45 approximately three-quarters of an inch. Extending vertically through such inwardly projecting portion of wall 65 are three passageways 66, 66, 66 positioned in registry with the discharge ends of the grooves 59 and forming discharge passages for the gas reaching the front end of the boat 45. The projecting portion of wall 65 is reduced in height to form a shelf 67 which together with the bottom surface of the cover 47 define a passageway 68 bringing the upper ends of the passageways 66 into communication with the front end of the interior of top boat 46. Boat 46, like boat 45, has three longitudinally extending grooves 69, 69, 69 formed in the bottom wall thereof and providing ingot molds for the metal (note FIGS. 6 and 7). The grooves 69 are in registry with the passageways 66 so that the gas discharged from each of the latter passes over an associated groove 69. Adjacent to the other or rear ends of the grooves 69, the cover 47 is provided with three openings 70, 70, 70 positioned in registry with such grooves and forming outlets for the gases arriving at such groove ends.

It will be understood from the foregoing that the gas discharged from the tube 16 into and through the adapter 21, passes upwardly in spread condition through the opening 54, then horizontally through passageway 58 and over the top edge of the inner portion of rear wall 55 defining the inner wall of opening 54. The gas travels forwardly over the charge of germanium dioxide placed in the bottom boat 45 and toward the front end of such boat to be discharged from the latter through the passageways 66 in the top boat 46. The gas emerging from the upper ends of the passageways 66 moves through the horizontal passageway 68 and then over the charge of dioxide contained in the grooves 69 of the top boat 46. The gas travels rearwardly over the material in grooves 69 and is then discharged into the muffle 11 through the outlet openings 70 in the cover 47.

It will be noted that by reducing the germanium oxide in closed chambers, a condition attained in the embodiment illustrated by the stacked relation of the two boats 45, 46 and the cover 47, the reducing gas is forced into intimate relation with the germanium dioxide in such boats and is caused to maintain such intimacy as it travels lengthwise over the deposits of such material. Such condition also makes it possible to accelerate the gas flow over the oxide material within such chambers. As a result, the water vapor that is formed because of the reaction between the reducing gas and the germanium dioxide is carried away as it forms and is not permitted to shield the dioxide material from the full intimate contact of the reducing gas. By thus increasing the rapidity of water removal as water vapor is formed in the reduction reaction it has been possible to improve substantially the reduction efficiency. The flow of the gas through the interiors of the boats 45, 46 is of such rapidity, being of the order of about 150 cu. ft./hr., that the possibility of any of the water vapor effecting the rapidity of the reducing action of the gas is reduced to a minimum.

While I have hereinabove described and illustrated in the drawings, a preferred embodiment of my invention, it will be apparent to those skilled in the art that changes and modifications may be made in such embodiment without departing from the spirit of the invention or the scope of the appended claims. Thus, the concept underlying the invention, namely, the utilization of a covered boat to reduced germanium oxide to germanium metal, may be realized with the use of more units than the two illustrated, and may be realized with the use of but a single covered unit, such as the boat 45' illustrated in FIG. 8 of the drawings. The boat 45' is substantially similar in construction to the above described bottom boat 45 in the stack 22 and is directly covered by a cover 47' similar to cover 47 of such stack. In such an assembly cover 47' should be made so that the discharge parts 70' are located adjacent to the front wall of boat 45'.

The floor configuration of each boat chamber may embody other shapes and sizes than the grooves 59 and 69 of boats 45 and 46 respectively, and may be such as to provide ingots of any size and shape dependent upon the particular production requirements involved. For example, the floor of the boat 45' illustrated in FIG. 8 of the drawings, may be provided with a single groove 59' to form a single ingot from the charge or such floor may have no groove or depression whatsoever and be configured around its periphery to provide the desired shape of the ingot.

Moreover, although the invention has been described with reference to the reduction specifically of germanium dioxide, it will be readily apparent to those skilled in the art that the apparatus and method herein disclosed may also be used for the reduction of other oxide materials which are reducible with a gas at elevated temperatures in like manner.

What is claimed is:

1. A method of reducing germanium dioxide to germanium metal which comprises the steps of placing a charge of germanium dioxide within the cavity of a graphite boat leaving a free space thereover within said cavity, completely enclosing said cavity so as to seal said germanium dioxide therein and to close said overlying free space at its top, sides and ends save for permitting gas entry at one end and discharge thereof from the opposite end of said boat through openings of cross-sectional area substantially less than the cross-sectional area of said overlying free space, heating said boat and its content in a chamber to a temperature of approximately 650° C., passing a stream of reducing gas from a source of supply in a closed conduit through said chamber and directly into said entry to effect passage of essentially all of the reducing gas used in the overall process through said cavity and the discharge thereof from the other end of said cavity, and to prevent entry of such reducing gas into said chamber until after such gas has been discharged from said cavity, and providing and maintaining a flow rate of said gas sufficiently to effectively remove from over the germanium dioxide the water vapor formed during the reduction action in such manner as to enable the reduction of germanium dioxide to germanium metal to proceed to completion within a significantly shorter time than required in the absence of such sealing of said boat.

2. A method of reducing a metal oxide which comprises taking a plurality of elongated graphite boats capable of forming within the bodies thereof chambers which are completely closed on all sides thereof except for each chamber having gas entry and discharge openings in the upper portions of the ends thereof and placing the metal oxide on the floor of each of such boats so that there are gas passages over the deposited metal oxide lengthwise of the chambers formed therein, then arranging the boats to form the chambers with the discharge opening of one chamber in direct communication with the entry opening of another chamber thereby enabling the gas to flow as a stream in a closed conduit successively over and in constant contact with such deposited metal oxide throughout the lengths of such chambers, and then while heating the metal oxide in the chambers in a furnace, feeding a reducing gas from a source of supply in a tube through said furnace and directly into the entry opening of said one chamber to effect passage of substantially the total volume of the reducing gas fed from such source of supply successively through said boat chambers before its discharge from the last of such boat chambers into said furnace, and feeding the reducing gas at such rate that the stream thereof passing over the deposited metal oxide and successively through such closed chambers removes from over the metal oxides and carries away as it is being formed, substantially all of the water vapor resulting from the reducing action of such gas on the metal oxide.

3. A method of reducing a metal oxide which comprises taking a plurality of elongated graphite boats capable of forming within the bodies thereof chambers which are completely closed on all sides thereof except for each chamber having gas entry and discharge openings in the upper portions of the ends thereof and placing the metal oxide on the floor of each boat so that there is a longitudinally extending gas passage over the deposited metal oxide in each chamber formed therein, then mounting the boats one upon the other in stacked relation so that the openings in one chamber thereof underlie the openings in another chamber with the discharge opening of said one chamber in communication with the entry opening of said other chamber, thereby forming with such chambers a common gas passageway enabling the gas to flow as a stream in a closed conduit successively over and in constant contact with such deposited metal oxide throughout the lengths of such chambers, and then while heating the metal oxide in the chambers in a furnace, feeding a reducing gas from a source of supply in a tube through said furnace and directly into the entry opening of said one chamber to effect passage of substantially the total volume of the reducing gas fed from such source of supply successively through said boat chambers before its discharge from the last of such boat chambers into said furnace, and feeding the reducing gas at such rate that the stream thereof passing over the deposited metal oxide and successively through such closed chambers removes from over the metal oxide and carries away as it is being formed, substantially all of the water vapor resulting from the reducing action of such gas on the metal oxide.

4. Apparatus for reducing a metal oxide in a reduction furnace comprising an elongated graphite boat having an open top and having two sides and two end walls of equal height providing an enclosed receptacle for the metal oxide to be reduced, a covering member seated on the upper edges of the walls of said boat and forming with said boat a substantially completely closed elongated chamber for the metal oxide deposited in said boat, said boat having a gas entry opening extending therethrough at one end thereof and said covering member having a gas discharge opening extending therethrough at a point adjacent to the other end of said boat, said gas entry and discharge openings being of cross-sectional area substantially less than the cross-sectional area of said chamber and directing gas passing therethrough transversely of the length of said chamber, said gas entry opening directing the gas upwardly into the upper portion of said closed chamber in said boat to enable the formation of a continuous gas passage in which the metal oxide deposited in said boat forms one wall portion thereof so that the gas passing therethrough is in direct contact with such metal oxide, and means associated with the entry opening in said boat for connecting the latter directly to a source of gas supply to effect passage of substantially the total volume of the gas from such source of supply into said boat and through said closed chamber thereof before being discharged from the latter through said discharge opening.

5. Apparatus such as defined in claim 4 in which the gas entry opening is formed in an end wall of said boat and includes a horizontal passage adapted to be connected by said associated means to the source of gas supply, and a vertical passage communicating at its lower end with said horizontal passage and communicating at its upper end with one end of said closed chamber.

6. Apparatus for the reduction of a metal oxide in a reduction furnace comprising a plurality of separable parts seated one upon the other in stacked relation and including separate elongated graphite boats having open tops and side and end walls of substantially equal height so that the bottom of an overlying boat forms with the body of an adjacent underlying boat on which it is seated an elongated substantially completely closed chamber adapted to receive a charge of the metal oxide to be reduced, and a separate elongated graphite cover seated on the upper edges of the side and end walls of the top boat in the stack and forming with the latter a top substantially completely closed elongated chamber adapted to receive a separate charge of the metal oxide to be reduced, each of the chambers formed by said parts having at one end a gas entry opening and having at its other end a gas discharge opening, the entry opening for each chamber being in an end wall of the boat forming the body of such chamber and the discharge opening for each chamber being in an adjacent overlying part, the entry opening in the end wall of an intermediate boat in the stack also constituting the discharge opening for the chamber formed in the body of an adjacent underlying boat, and means associated with the entry opening in the end wall of the bottom boat in the stack for coupling such opening directly to a source of gas supply so as to effect passage of substantially the total volume of the gas from such source of supply into said bottom boat, and successively through the stack of boats before being discharged into the furnace from the chamber of the top boat.

7. Apparatus for the reduction of a metal oxide in a reduction furnace comprising a plurality of separable parts seated one upon the other in stacked relation and including a pair of separate elongated graphite boats having open tops and side and end walls substantially equal height so that the bottom of the top boat in the pair forms with the body of the bottom boat of the pair on which it is seated an elongated substantially completely closed chamber adapted to receive a charge of the metal oxide to be reduced, and a separate elongated graphite cover seated on the upper edges of the side and end walls of the top boat in the stack and forming with the latter a top substantially completely closed elongated chamber adapted to receive another charge of the metal oxide to be reduced, the bottom boat in said pair having at one end of the length of the stack an end wall provided with a horizontal opening adapted to be connected to a source of gas supply, and with a vertical opening communicating at its lower end with said horizontal opening and communicating at its upper end with one end of the chamber formed in said bottom boat, the top boat in said pair having at the other end of the length of the stack an end wall provided with an opening forming a discharge opening for the other end of the chamber in said bottom boat and an entry opening into one end of the chamber formed in said top boat, the gas discharging from said bottom boat into said top boat traveling through the chamber of the latter in a direction opposite to that in which it travels through the chamber in said bottom boat, and means associated with the horizontal opening in said bottom boat for coupling such opening directly to a source of gas supply so as to effect passage of substantially the total volume of the gas from such source of supply into said horizontal opening and successively through the stack of boats.

8. Apparatus such as defined in claim 5, in which the vertical passage of the entry opening in said boat has a transverse dimension greater than one-half the width of the chamber in said boat.

9. Apparatus such as defined in claim 8, in which the bottom wall of said boat is configured to form the reduced metal oxide into a plurality of longitudinally extending ingots, and said vertical passage has a transverse dimension such that it can be discharge gas over the adjacent ends of all of the ingot forming portions of such bottom wall.

10. Apparatus such as defined in claim 7, in which the bottom wall of the chamber in said top boat is configured to form the reduced metal oxide into a plurality of longitudinally extending ingots, and said combined discharge and entry opening in said top boat is configured to discharge gas from said bottom chamber over the adjacent ends of all of the ingot forming portions of such bottom wall of the top boat.

11. Apparatus such as defined in claim 10, in which said top boat opening is constituted of a plurality of gas passages in registry with such ingot forming portions of the bottom wall of the top boat.

12. Apparatus for the reduction of a metal oxide comprising a reduction furnace, a horizontally disposed silica muffle extending through the chamber of such furnace, and having a closed end projecting from one end of such furnace, an elongated graphite boat containing a charge of the metal oxide to be reduced positioned in the portion of said muffle located in said furnace chamber, said boat having side and end walls of substantially equal height providing an elongated enclosed chamber for the charge of metal oxide, and having through one end wall thereof an entry opening of cross-sectional area substantially less than the cross-sectional area of said chamber, and a covering member seated on said side and end walls and substantially completely closing the chamber of said boat, said muffle having at the closed end thereof an integral silica extension of reduced cross-sectional area, gas supply means extending through said extension and being directly coupled to said entry opening of said boat to effect passage of substantially the total volume of gas from said gas supply means into said entry opening and through the chamber in said boat, and an opening in said associated covering member adjacent to the other discharge end of said boat and bringing such other discharge end of said boat into communication with the interior of said muffle so that the total volume of gas from said gas supply means is discharged into said muffle after passing through said boat.

13. Apparatus such as defined in claim 12, in which said gas supply means is detachably connected to said boat to enable the latter to be moved along said muffle, and a cooling chamber positioned adjacent to said furnace and enclosing another portion of said muffle into which said boat may be moved.

References Cited by the Examiner
UNITED STATES PATENTS

| | | | |
|---|---|---|---|
| 929,578 | 7/09 | Fuller | 75—84 |
| 1,283,286 | 10/18 | Pfanstiehl | 75—84 |
| 2,402,084 | 6/46 | Rennie | 75—84 |
| 2,593,015 | 4/52 | Dreher | 23—292 |
| 2,615,060 | 10/52 | Marinace et al. | 75—84 |
| 2,679,080 | 5/54 | Olsen | 75—84 |

CARL D. QUARFORTH, Primary Examiner.
RUEBEN EPSTEIN, Examiner.

UNITED STATES PATENT OFFICE
CERTIFICATE OF CORRECTION

Patent No. 3,177,066                                   April 6, 1965

Runyon G. Ernst

It is hereby certified that error appears in the above numbered patent requiring correction and that the said Letters Patent should read as corrected below.

Column 1, line 71, for "electriaclly" read -- electrically --; column 4, line 70, for "reduced" read -- reduce --; column 6, line 1, for "oxides" read -- oxide --; column 7, line 28, after "walls" insert -- of --; column 8, line 4, strike out "be".

Signed and sealed this 21st day of September 1965.

(SEAL)
Attest:

ERNEST W. SWIDER                                   EDWARD J. BRENNER
Attesting Officer                                        Commissioner of Patents

UNITED STATES PATENT OFFICE
CERTIFICATE OF CORRECTION

Patent No. 3,177,066                                        April 6, 1965

Runyon G. Ernst

It is hereby certified that error appears in the above numbered patent requiring correction and that the said Letters Patent should read as corrected below.

Column 1, line 71, for "electriaclly" read -- electrically --; column 4, line 70, for "reduced" read -- reduce --; column 6, line 1, for "oxides" read -- oxide --; column 7, line 28, after "walls" insert -- of --; column 8, line 4, strike out "be".

Signed and sealed this 21st day of September 1965.

(SEAL)
Attest:

ERNEST W. SWIDER                                    EDWARD J. BRENNER
Attesting Officer                                       Commissioner of Patents